US012462207B2

(12) United States Patent
Conde-Berrocal

(10) Patent No.: US 12,462,207 B2
(45) Date of Patent: Nov. 4, 2025

(54) METHOD OF MANAGING INFORMATION SECURITY PROGRAM MATURITY

(71) Applicant: V3 Cybersecurity, Inc., Jacksonville, FL (US)

(72) Inventor: Jorge A. Conde-Berrocal, Jacksonville, FL (US)

(73) Assignee: V3 Cybersecurity, Inc., Jacksonville, FL (US)

( * ) Notice: Subject to any disclaimer, the term of this patent is extended or adjusted under 35 U.S.C. 154(b) by 0 days.

(21) Appl. No.: 18/050,664

(22) Filed: Oct. 28, 2022

(65) Prior Publication Data

US 2023/0098977 A1 Mar. 30, 2023

Related U.S. Application Data

(63) Continuation-in-part of application No. 16/396,954, filed on Apr. 29, 2019, now abandoned.

(51) Int. Cl.
*G06Q 10/0635* (2023.01)
*G06F 21/62* (2013.01)

(52) U.S. Cl.
CPC ..... *G06Q 10/0635* (2013.01); *G06F 21/6254* (2013.01)

(58) Field of Classification Search
CPC .. G06Q 10/0635; G06Q 10/067; G06Q 40/06; G06F 21/6254; G06F 21/55; G06F 21/57
See application file for complete search history.

(56) References Cited

U.S. PATENT DOCUMENTS

| | | | |
|---|---|---|---|
| 10,904,277 B1* | 1/2021 | Sharifi Mehr | H04L 63/1425 |
| 2010/0095235 A1 | 4/2010 | Bennett et al. | |
| 2011/0112876 A1* | 5/2011 | Khare | G06Q 10/063 705/7.11 |
| 2016/0086114 A1* | 3/2016 | Krishna | G06Q 10/0637 705/7.36 |

(Continued)

OTHER PUBLICATIONS

Mahmoud Khraiwesh, "Risk Management Measures in CMMI," International Journal of Software Engineering & Applications (IJSEA), vol. 3, No. 1, Jan. 2012, pp. 1-15. (Year: 2012).*

(Continued)

*Primary Examiner* — Kyle R Stork
(74) *Attorney, Agent, or Firm* — McHale & Slavin. P.A.

(57) ABSTRACT

Disclosed is a method of more effectively managing and displaying an Information Security Management System (ISMS), or Cybersecurity Framework, by an application executing on a computer device for computing and displaying real time dynamic metrics and market comparison for the User. The method includes authenticated and authorized Users to conduct security baselines based on industry accepted standards in order to establish a plurality of metric baselines dynamically and in real time. The method further includes projects submitted to be measured against organizational goals and simulate the impact to the Security baselines. The method further includes the ability to provide financial visibility into the financial exposure of a Security Breach, or Data exfiltration and other available financial metrics. The method further includes a platform by which companies may request Virtual CISO's services from a pool of executive level resources.

17 Claims, 12 Drawing Sheets

Data Request Workflow

(56) References Cited

U.S. PATENT DOCUMENTS

| | | |
|---|---|---|
| 2016/0350886 A1 | 12/2016 | Jessen et al. |
| 2016/0359899 A1* | 12/2016 | Zandani .............. H04L 63/1425 |
| 2018/0004948 A1* | 1/2018 | Martin ................ H04L 63/1425 |
| 2018/0018602 A1 | 1/2018 | DiMaggio et al. |
| 2018/0167414 A1* | 6/2018 | O'Reilly ................ H04L 63/20 |
| 2019/0034845 A1 | 1/2019 | Mo et al. |

OTHER PUBLICATIONS

Arena et al., "SecureDroid: An Android Security Framework Extension for Context-Aware Policy Enforcement," 2013 International Conference on Privacy and Security in Mobile Systems (PRISMS), Jun. 24-27, 2013, pp. 1-8. (Year: 2013).*

Silva et al. "Using CMMI together with agile software development: A systematic review," Information and Software Technology, vol. 58, Feb. 2015, pp. 20-43. (Year: 2015).*

Naumov et al. "Dynamic framework for assessing cyber security risks in a changing environment," 2016 International Conference on Information Science and Communications Technologies (ICISCT), Nov. 2-4, 2016, pp. 1-4. (Year: 2016).*

Söderström et al. "Standards for information security and process in healthcare," Aug. 14, 2009, Journal of Systems and Information Technology, pp. 295-308. (Year: 2009).*

Trcek, Denis, "An integral framework for information systems security management," 2003, Computers and Security, vol. 22, No. 4, pp. 337-360. (Year: 2003).*

\* cited by examiner

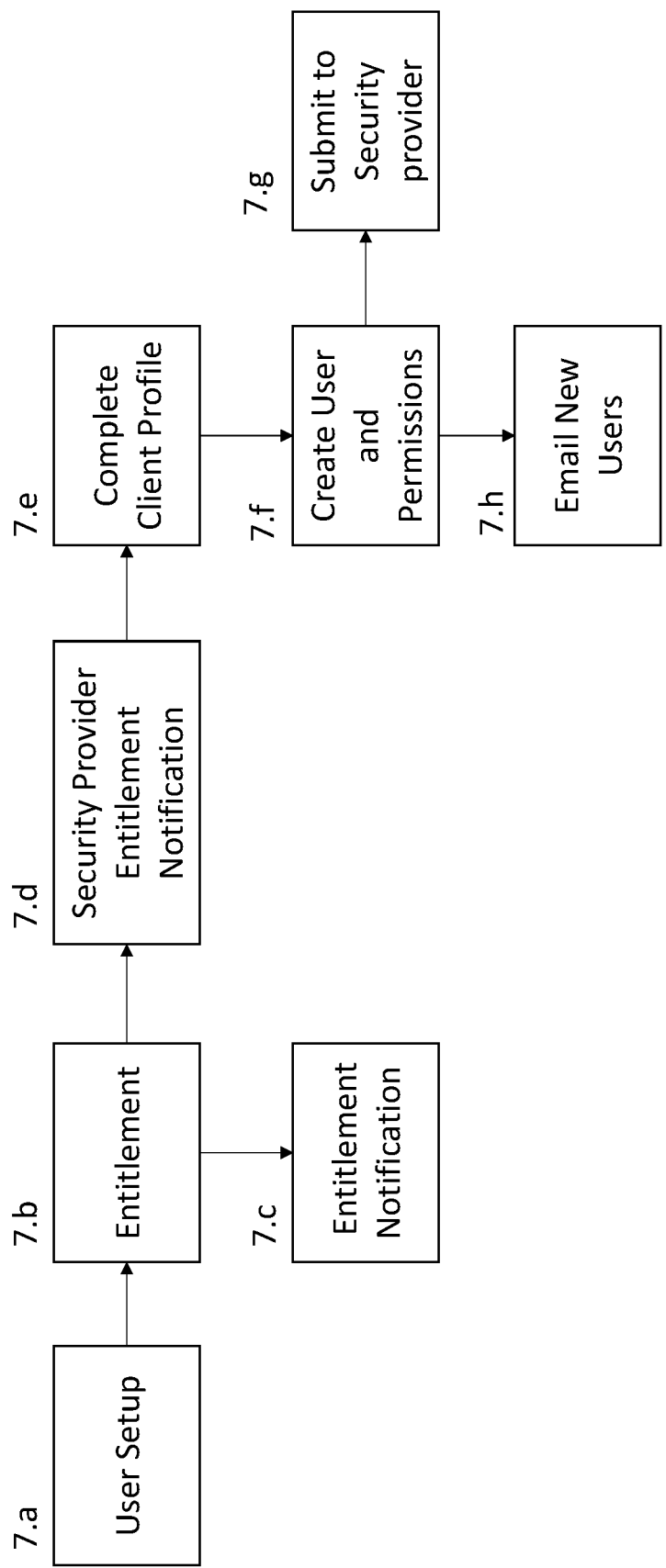
FIG. 7: Client Setup workflow

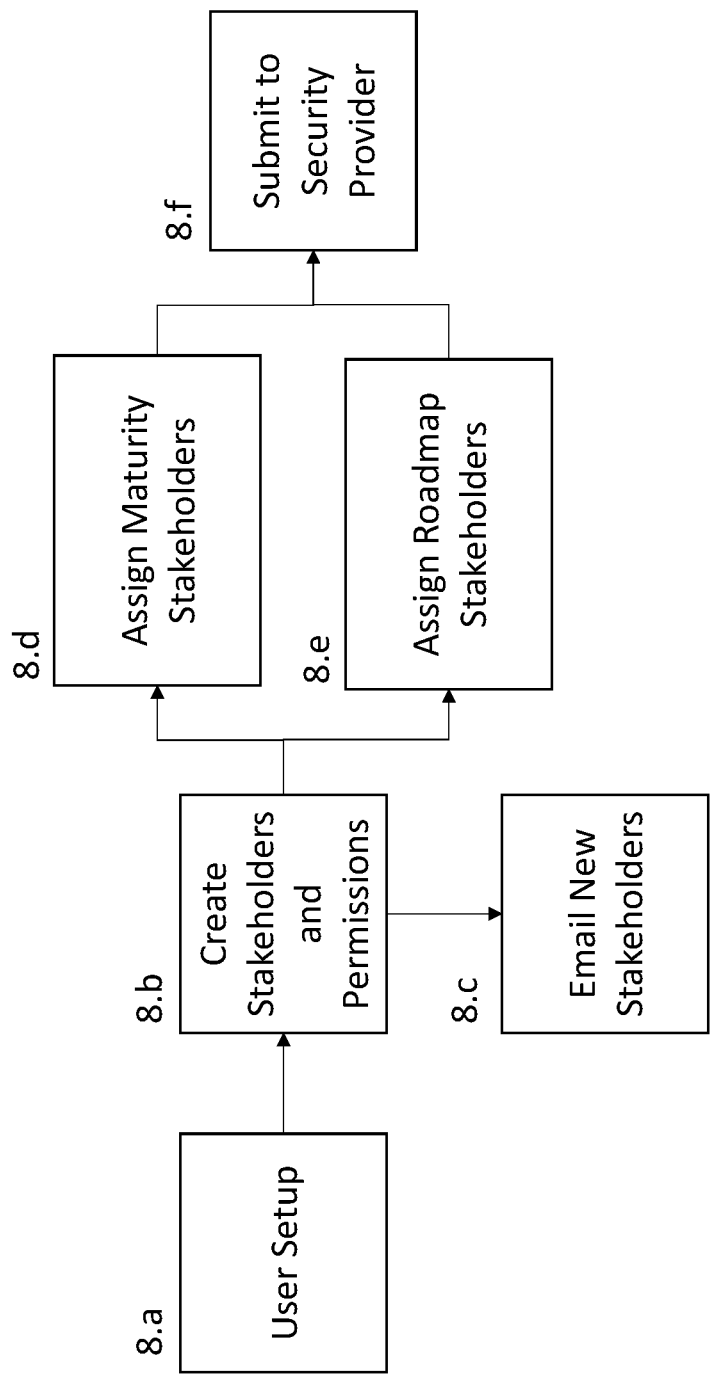
FIG. 8: Stakeholder Assignment Workflow

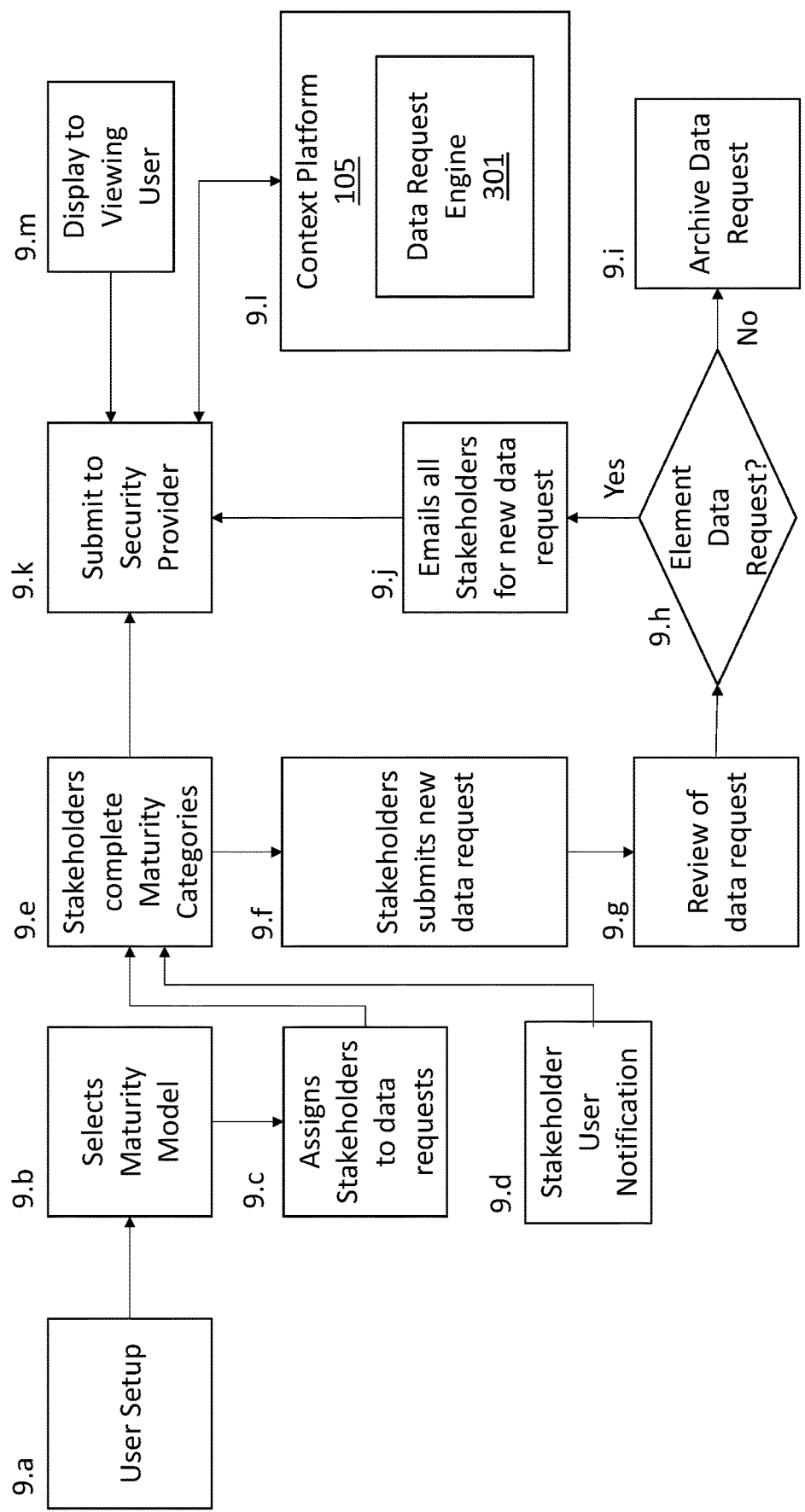
FIG. 9: Data Request Workflow

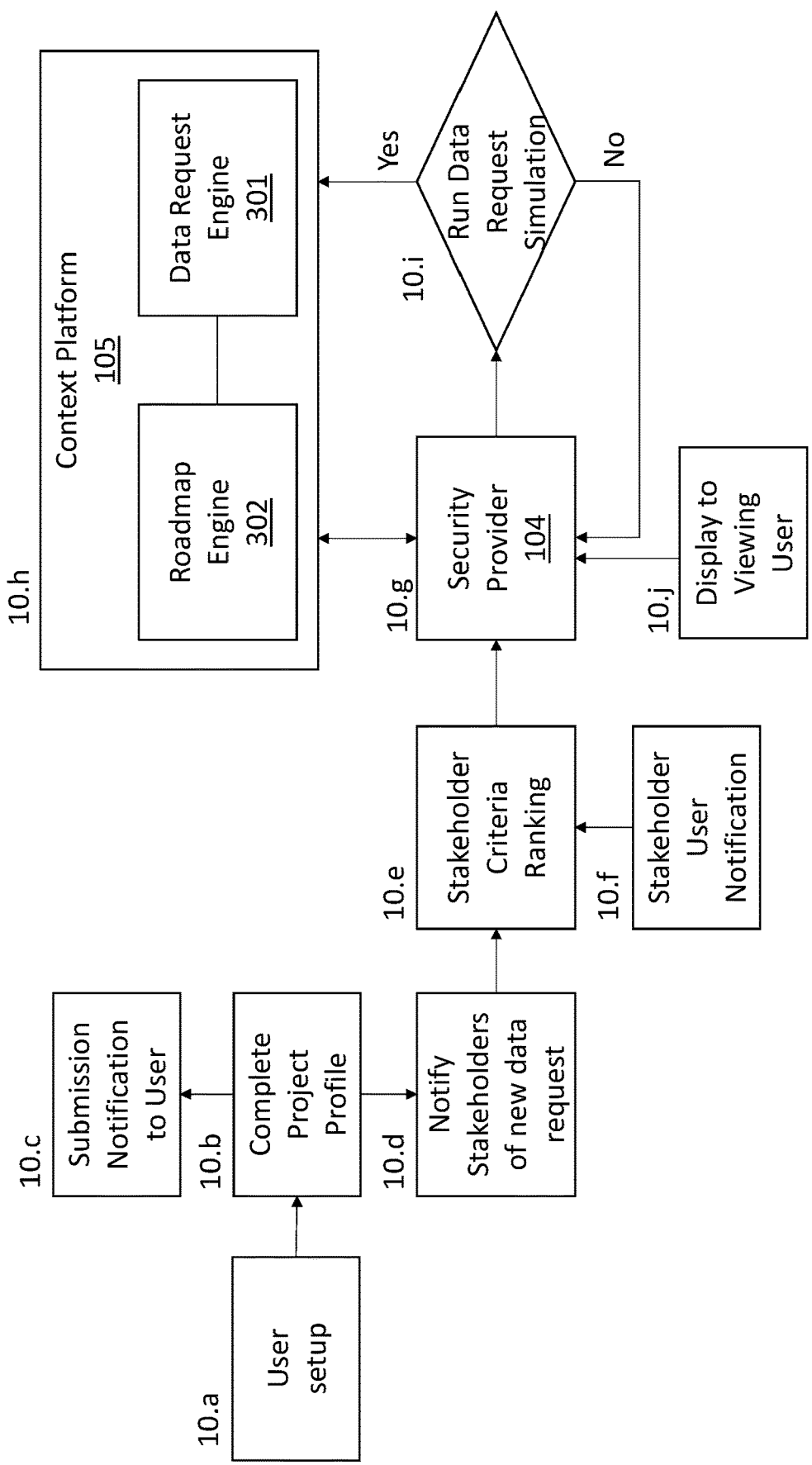
FIG. 10: Roadmap Workflow

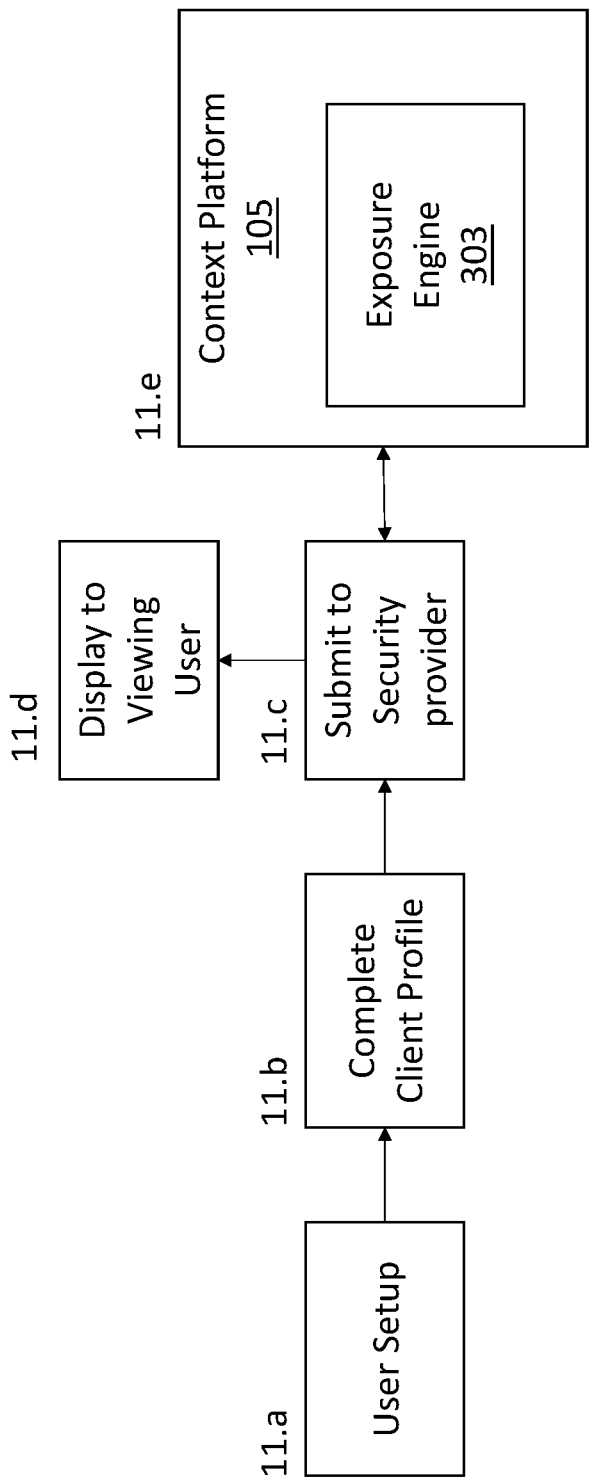
FIG. 11: Exposure Workflow

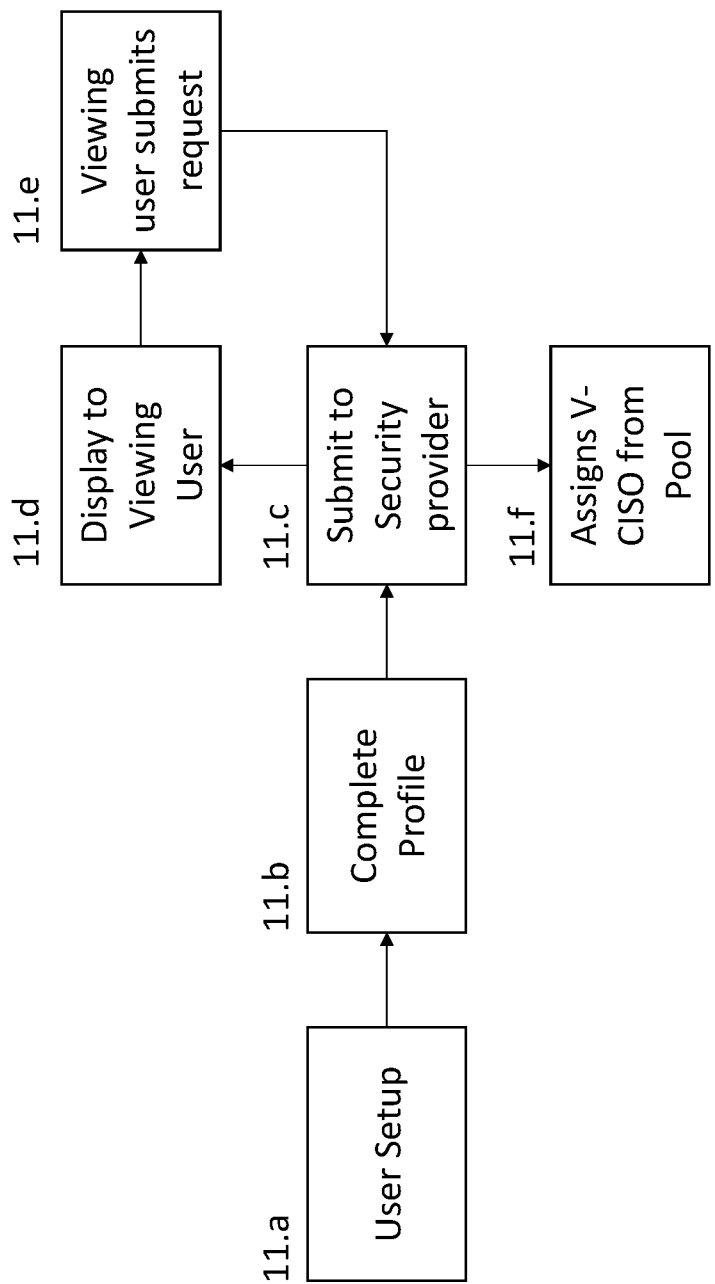
FIG. 12: Virtual CISO Workflow

METHOD OF MANAGING INFORMATION SECURITY PROGRAM MATURITY

PRIORITY CLAIM

In accordance with 37 C.F.R. § 1.76, a claim of priority is included in an Application Data Sheet filed concurrently herewith. Accordingly, the present invention is a continuation-in-part patent application of U.S. patent application Ser. No. 16/396,954 entitled "METHOD OF MANAGING INFORMATION SECURITY PROGRAM MATURITY", filed Apr. 29, 2019, the contents of which is incorporated herein by reference.

FIELD OF THE INVENTION

The present invention relates generally to the dynamic presentation of Information Security Management Program (ISMP) about a particular going concern, and more particularly to the systems and methods for presenting Information Security Management Program Maturity, Investment Ranking, Simulated Impact Analysis, Breach Exposure Value and relationships to other Going Concerns in real time.

BACKGROUND OF THE INVENTION

Cybersecurity organizations traditionally suffer from inconsistent operations, lack of visibility, lack of meaningful metrics, and a lack of effective communication to the executive team and board of directors. This is largely due to the immaturity of the Cybersecurity industry, the ever-shifting threat landscape, and the shortage of Cybersecurity skills. With the growing liability due to new regulations and focus on data privacy, organizations continue to struggle with understanding their financial exposure, program maturity, project impact analysis decision, and relative posture against other organizations in their attempt to show Due Care. While we continue to see maturity operationally and technologically, there is still and significant gap in the management of security programs due to the lack of visibility and understanding of the impact of Cybersecurity within individual organizations.

There are some existing mechanisms that allow organizations to assess their Information Security Management Program, or Cybersecurity Framework. Typically, these manual assessments vary in outcome due to a dependence on the assessors and quickly lose significance because they are point in time events. In other words, the organization must spend time, effort and resources with a third-party assessor in order to obtain a point in time report, which may not give them a valid view of their organizational posture and will become quickly irrelevant.

Likewise, there are existing mechanisms for roadmap development and project Impact analysis, however these exercises and methods are primarily manual and require significant amounts of time, effort, and resources. Just as concerning is that the Project Impact Analysis is subject to sponsor bias, typically does not take into consideration all the organizational stakeholders and has limited financial analysis outside of limited operational and technological costs.

In addition to the existing mechanisms available for assessment and program management, the ability for organizations to understand the value of their exposure continues to elude organizations. This can be primarily attributed to a couple prevailing concepts. The first is the idea that organizational risk has subjective elements that cannot be quantified and thus a value cannot be derived. An example of such qualitative attributes is reputational damage in the event of a Security Breach, or Data Leakage. The second concept is that most organizations have access to limited information and thus cannot provide a holistic view of organizational exposure.

Lastly, there is a skills shortage across the Security industry. The shortage is even more so when it comes to skilled and experienced executive level resources, primarily the Chief Information Security Officers. The skills shortage has led to increasing salaries which in turn has created a number of underserved organizations that require the skills and experience of a tenured CISO but cannot afford to hire the ideal candidate. Many organizations have the same regulatory requirements and face the same threats as major organizations and this market dynamic introduces additional risk into these underserved and resource constrained organizations.

SUMMARY OF THE INVENTION

Disclosed is a method of more effectively managing and displaying an Information Security Management System (ISMS), or Cybersecurity Framework, by an application executing on a computer device for computing and displaying real time dynamic metrics and market comparison for the User. The method includes authenticated and authorized User to conduct security assessments based on industry accepted standards in order to establish a plurality of metric baselines dynamically and in real time. The method further includes authenticated and authorized Stakeholders to anonymously rank investments projects submitted by an authorized group of Users against organizational goals and simulate the impact to the current ISMS, or Cybersecurity Framework, baselines. The method further includes the ability to provide financial visibility into the financial exposure of a Security Breach, or Data exfiltration and other available financial metrics. The method further includes a platform by which companies may obtain Virtual CISO's services on a full-time, part-time, project, or consultative basis from a pool of experienced executive level resources in support of implementing a more effective ISMS, or Cybersecurity Framework. All client data is encrypted at rest and in motion utilizing industry accepted encryption implementations such as TLS for Data-In-Motion and TDE for Data-At-Rest.

An objective of the invention is to provide executive and board level communication regarding the organizations security posture through contextualizing the security baselines in a business context.

Another objective of the invention is to provide organizations dynamic and real time visibility to security program utilizing real time market exchange data.

Still another objective of the invention is to develop a dynamic and real time means of quantifying the impact of Security Breaches, or Data Leakage to the value of an organization.

Another objective of the invention is to provide dynamic and real time simulation modeling of data requests for a particular organization against the organizational baselines and industry peers.

Yet still another objective of the invention is to address the executive level Cybersecurity skills shortage through the use of a virtual pool of experienced resources.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWING

FIG. 7 is a workflow diagram for setting up new clients and users;

FIG. 8 is a workflow diagram for setting up new stakeholder users;

FIG. 9 is a workflow diagram for implementing a model Data Request process and implementation of a continuous and dynamic improvement process;

FIG. 10 is a workflow diagram for implementing a model Roadmap Development process which allows for simulated maturity impact analysis;

FIG. 11 is a workflow diagram for implementing a model exposure valuation which provides real time financial valuation of an enterprise's exposure in the event of a Security Breach, or Data Leakage; and FIG. 12 is a workflow diagram for providing a model Virtual CISO service.

DETAILED DESCRIPTION

Figure 1:
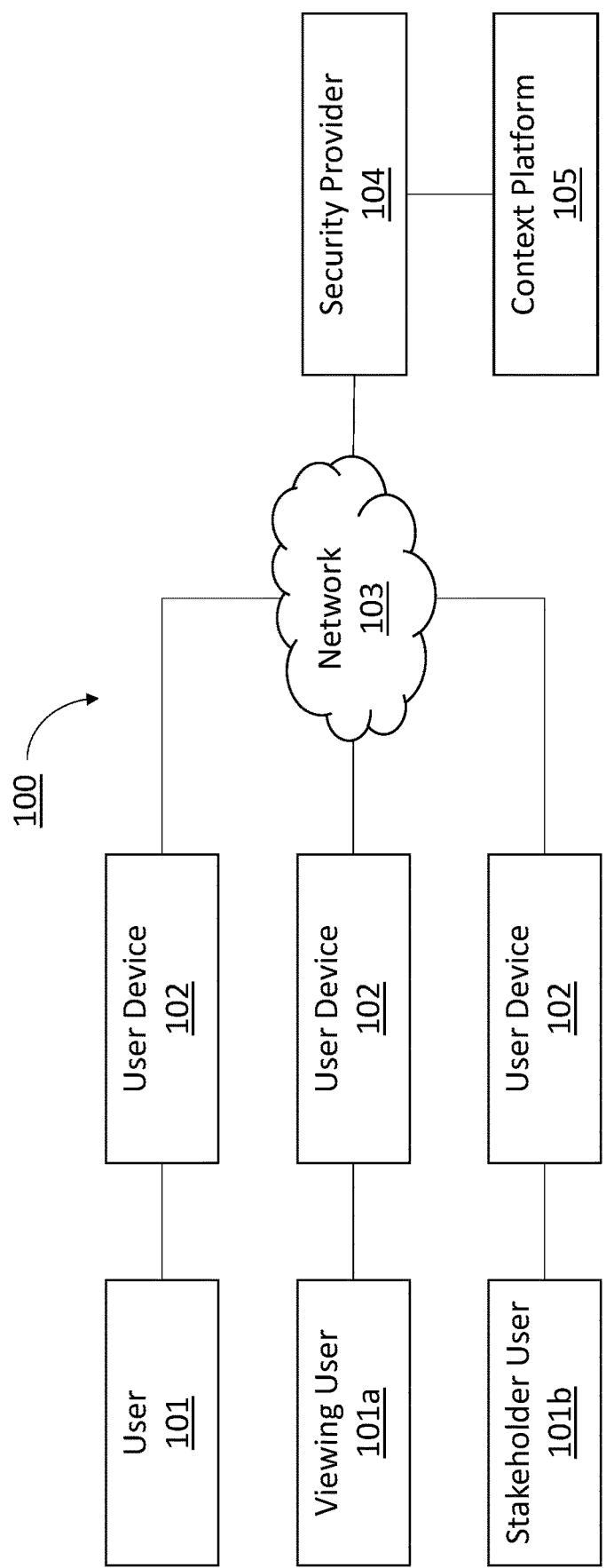
FIG. 1 illustrates a model operating environment for generating real time dynamic management content for this invention.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

A system and method for dynamically presenting an ISMS for a particular organization and the potential exposure of a Security Breach, or Data Leakage, while comparing it to like organizations. A User 101 of the Context Platform 105 is exercising a common principle of due care and establishing maturity baseline for their respective organization. The baseline input is generated using an anonymous questionnaire sent to the assigned stakeholders. The stakeholder input is then automatically scored utilizing an open industry standard for communicating baselines. For example, the CMMI scale could be used in the case of maturity. The results are then anonymously aggregated into a database which can be used to develop additional metrics for comparison with the organizations existing baseline. The maturity score will be displayed in a graph and made available for transfer to other communication formats (e.g. Microsoft PowerPoint) for Viewing Users. Users will also be able to submit new questions for consideration within the data request. If the question is viewed to be relevant, the Security Provider will publish the singular question to all the Users allowing the Users data request engine 301 to remain aligned with industry standards and peer organizations. The data request database 304 will continuously be updated as clients are onboarded and the organizational relative to peers will be updated dynamically in real time. The User will be able to identify if they are aligned with their peers in dynamically over time. Additional financial metrics will be provided in combination with the baseline information and the client profile data provided. For example, the budget to employee ratio which will also be compared against peer organizations, and so forth.

The User will also be able to utilize the roadmap function to organize and develop the most effective investment strategy for the particular organization. The implementation of the program management method will allow the User to gather input from all levels of the authorized organization and allow them to be submitted over the network. The submitted project will be evaluated by designated stakeholders against the organization's critical objectives. Once the projects are ranked, the order ranked projects that are within the organizations resource constraints can be further evaluated. These projects can then be submitted for review by the maturity stakeholders and submitted into the Data Request engine 301 to provide simulated maturity scores. This will allow the User to avoid stakeholder bias and better understand the impact analysis of the project on the organization as a whole. The simulation score will be displayed in a graph and made available for transfer to other communication formats (e.g. Microsoft PowerPoint) for Viewing Users.

The User will be able to utilize the Exposure Engine 303 and their company profile to, in real time and dynamically, view the average financial exposure that peer organizations that have experienced Security Breaches, or Data Leakage have endured. The exposure value along with the maturity and company profile will allow the User to obtain a baseline score for the organization allowing for better understanding of the organizations Security posture and that of the organization's peers. As more organizations are added and more breaches researched, the value of the information will continue to provide stronger insight into the Users organization security posture. Given the lack of skills at the executive level within the Security domain and the number of underserved organizations, there will also be a Virtual CISO Interface 202 in which organizations may view profiles of CISOs and match their need to the respective profiles. This will allow organizations to contract increments of time from vetted Security executives to assist with their Security Program, or to help apply the Context platform 105.

FIG. 1 illustrates a model environment 100 for the implementation of this invention in a networked environment. An authenticated and authorized User 101 at user devices 102, are securely connected to a Security Provider 103 via a network 104. The Security Provider 103 may comprise of any entity that provides technological delivery and execution of Security Data Requests, Program Management, Security Executive Skills Acquisition and Security Breach, or Data Leakage, Exposure Valuation, and so forth. For Example, the Security Provider 103 may host a website that allows for users 101, viewing user 101a, and stakeholder user 101b, at one or more user devices 102, to interact with the Security Provider through the website. The Security Provider website offers users 101 the ability to develop organizational profiles and initiate the Context Platform 105. The Security Provider website also offers users 101 the ability to develop personal profiles which can be viewed by other users 101 connected to the Security Provider 103 website.

In one instance, a viewing user 101*a* associated with a user device 102 can securely connect with the Security Provider 103 in order to view and download the output from the Context Platform 105 in preparation for a board level presentation with the knowledge that the information is limited in its bias and consistent in its application.

In a second instance, a stakeholder user 101*b* associated with a user device 102 can securely connect with the Security Provider 103 to submit their responses to their authorized entitlements (e.g. data request, roadmap development, etc.).

In some embodiments, the user 101, the viewing user 101*a* and the stakeholder user 101*b* may be the same user, for example, the user 101 may be assigned as a stakeholder user 101*b*, the user 101 with a user device 102 may act as a viewing user 101*a* when receiving content from the Security Provider 103 for communication purposes.

The Context Platform 105 is coupled to the Security Provider 104. The Context platform 105 utilizes data entered by the User 101, stakeholder User 101*b*, or Service Provider 103 to calculate one or more items of content for display to a user such as the viewing user 101*a*. According to some embodiments, elements of the Context Platform 105 may be coupled directly to the user 101, the viewing user 101*a*, or the stakeholder user 101*b* via a user device 102.

Figure 2:
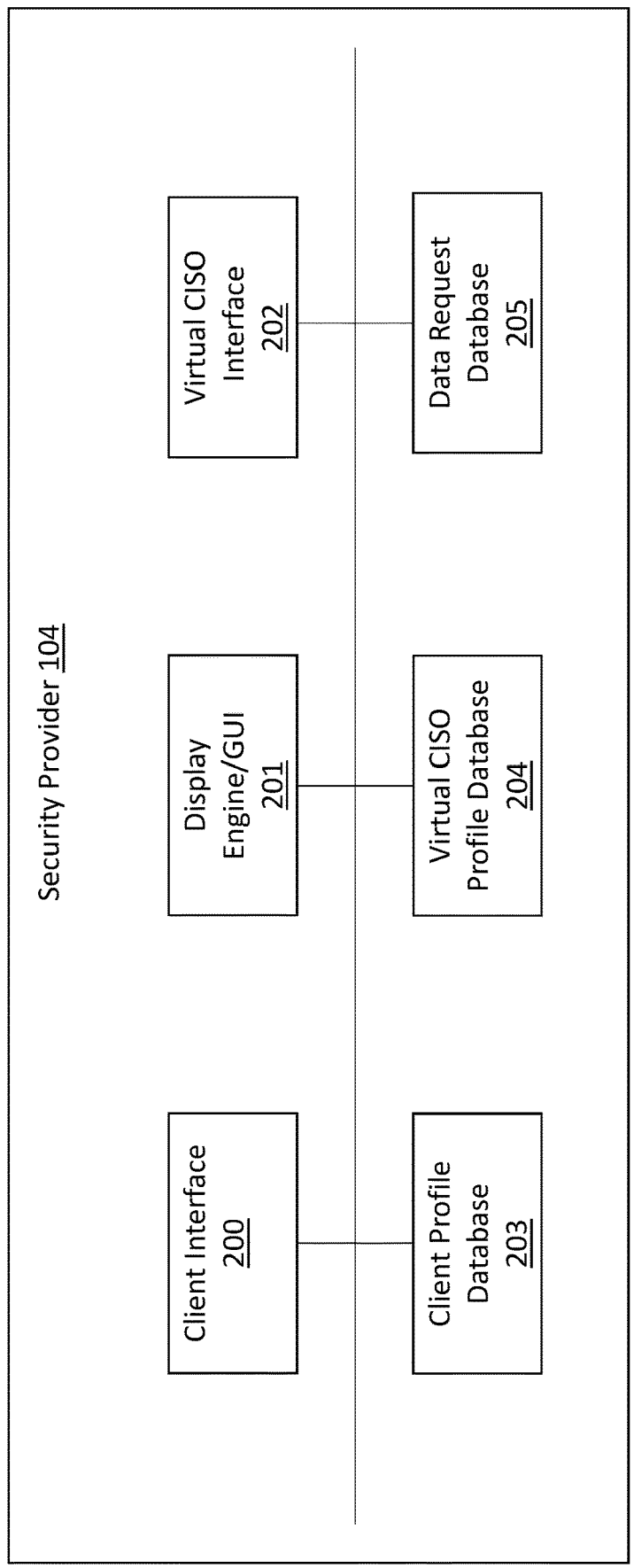
FIG. 2 is a block diagram of a model Security Provider.

Referring now to FIG. 2, a block diagram of a model Security Provider, such as the Security Provider 103 shown in FIG. 1, is shown. A Client Profile Database 203 is provided for storing data associated with each of the users, such as user 101, viewing user 101*a*, and stakeholder user 101*b* using a user device 102. When a user 101 subscribes to services provided by the Security Provider 104, a client profile may be generated for the user 101 via the Client Interface 200. For example, user 101 may provide contact information, staffing levels, organizational metrics, and specify membership in various user groups such as viewing user 101*a* or stakeholder user 101*b*. When the user 101 adds additional information to the client profile, such as adding organizational metrics, the client profile in the Client Profile Database 203 may be updated with the information added. The client profile may be stored, modified, added and so forth to any storage medium. The client profile data will be used with baseline information to derive various dynamic views in real time. For Example, the budget to baseline ratio in a maturity report, and so forth. A timestamp may be associated with the Client Profile. Examples of timestamp include order of occurrence in a database, date, time of day, and the like.

A Virtual CISO Profile Database 204 is provided for storing data associated with each of the users, such as user 101 and viewing user 101*a* using a user device 102. When a user 101 subscribes to services provided by the Security Provider 104, a CISO profile may be generated for the user 101 via the Virtual CISO Interface 202. For example, user 101 may provide contact information, provide personal statistics, specify membership in various organizations, indicate interests, specify level of education, identify certifications held, identify hourly rate, indicate availability, and so forth. When user 101 adds additional information to the user profile, such as adding additional experience, the Virtual CISO Profile Database 202 may be updated with the information added. The virtual CISO profile may be stored, modified, added and so forth to any storage medium. A timestamp may be associated with the Client Profile. Examples of timestamp include order of occurrence in a database, date, time of day, and the like. Additionally, a user 101 may submit a request for services to the Security Provider 104 via the Virtual CISO Interface 202. The Security Provider 104 includes a Client Interface 200 for the user 101 and stakeholder user 101*b* to enter data via the user device 102 over the network 103. The user device 102 communicates the various types of information, such as client profile entries, data request responses, project details, and so forth, to the Security Provider 104 via the Client Interface 200. Any type of communications interface is within the scope of the various embodiments. The Security Provider 104 includes a Client Interface 200 and a Virtual CISO Interface 202 for the user 101 to enter data vie the user device 102 over the network 103. The user device 102 communicates the various types of information, such as personal statistics, specify membership in various organizations, indicate interests, specify level of education, identify certifications held, identify hourly rate, indicate availability, and so forth, to the Security Provider 104 via the Client Interface 200 and Virtual CISO Interface. Any type of communications interface is within the scope of the various embodiments.

A display engine/GUI 201 may also be provided by the Security Provider 104. The display engine/GUI 201 displays the one or more items of Context Platform 105 content, profile information, and so forth to users 101, viewing users 101*a* and stakeholder users 101*b*. Users 101, viewing users 101*a* and stakeholder users 101*b* can interact with the Security Provider 104 via the display engine/GUI 201. For example, viewing users 101*a* can display the output of the Context Platform 105 for communication to the board regarding the upcoming annual investments roadmap and impact analysis. In another example, the user 101 could display search results from the Virtual CISO Profile Database 204 via the display engine/GUI 201 during their search for a virtual CISO that meets the Users match criteria. The display engine/GUI is also responsible for producing User 101 and viewing user 101*a* content in various formats for use in communication of content. For example, a viewing user 101*a* downloads the maturity score in order to present to the board in .ppt format.

According to some embodiments, the Security Provider may determine a profile match between the User 101 and the Virtual CISO Profile Database 204. For example, if a user 101 searches for a specific profile, the Security Provider may return profile matches in order to provide the user 101 with filtered content making the search process more valuable for the user.

Although the Security Provider 104 is described as being comprised of various components (the Client Interface 200, the Display Engine/GUI 201, the Virtual CISO Interface 202, the Client Profile Database 203, and the Virtual CISO Profile Database 204), fewer or more components may comprise the Security provider 104 and still fall within the scope of the various embodiments.

The Context Platform 105 is configured to accept data input from various sources for a particular request from the Security Provider 104. The data input into the Context Platform 105 is directly related to the specific services being provided by the Security Provider 104. The Context Platform 105 may filter, display and utilize the data provided by users 101 for computational purposes. The Context Platform 105 will provide the data to the display engine/GUI 201 for communication purposes with authorized user devices 102. The Context Platform 105 may also interact directly with the users 101, viewing users 101*a* and stakeholder users 101*b*.

Figure 3:
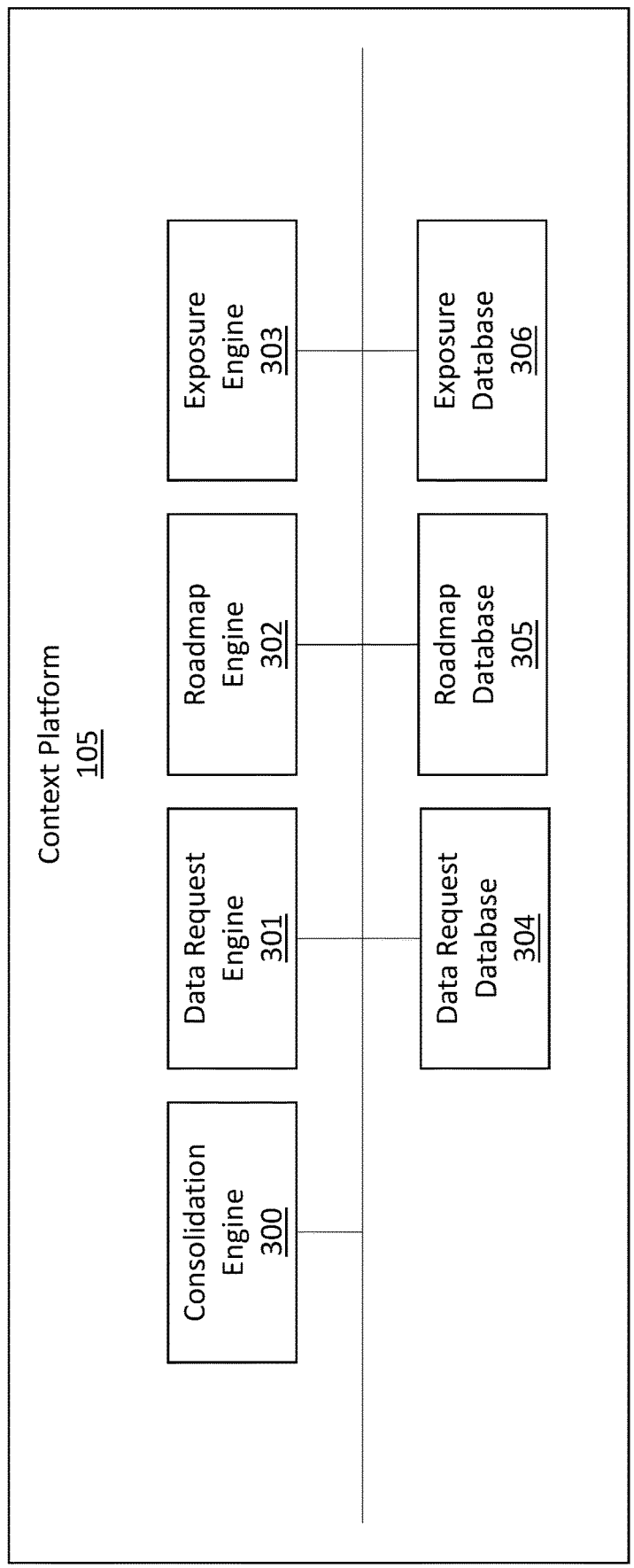
FIG. 3 is a block diagram of a model Context Platform.

FIG. 3 is a block diagram of a model context platform 105. The Context Platform 105 includes the Consolidation Engine 300, the Data Request Engine 301, the Roadmap Engine 302, the Exposure Engine 303, the Data Request Database 304, the Roadmap Database 305 and the Exposure Database 306 which interact with the Security Provider 104 to provide content to the User 101, Viewing User 101a, and Stakeholder User 101b via User Devices 102 over the Network 103.

The Consolidation Engine 300 is used to access $3^{rd}$ party products and data feeds. For example, if the user 101 through the Client Interface 200 requests integration with their vulnerability management tooling and reports, the Consolidation Engine 300 may filter, display or utilize the data inputs in the development of content to be displayed via the display engine/GUI 201 to user devices 102 over the network 103.

The Data Request Engine 301 is configured to receive input from the user 101, stakeholder user 101b, or Security provider 104 via the client interface 200 on a user device 102 over a network 103. For example, a stakeholder user 101b may answer data request questions via the client interface 200 utilizing a user device 102 over a network 103 in order to obtain a maturity baseline which will be displayed via the Security provider 104, and so forth.

The Roadmap Engine 302 is configured to receive input from the user 101, stakeholder user 101b, or Security provider 104 via the client interface 200 on a user device 102 over a network 103. For example, a stakeholder user 101b may rank a project via the client interface 200 utilizing a user device 102 over a network 103 in order to obtain a prioritized list of projects which will be displayed to the User 101 via the Security Provider 104, and so forth.

The Exposure Engine 303 is configured to receive input from feeds and the Security provider 104 via the client interface 200 on a user device 102 over a network 103. For example, the Security Provider 104 may submit research content via the client interface 200 utilizing a user device 102 over a network 103 in order to, in real time, compute the organizational exposure which will be displayed to the user 101 via the Security Provider, and so forth.

The Data Request Database 304 is provided for storing data associated with user 101 and stakeholder user 101b input regarding the users 101 organization. When a user 101 subscribes to services provided by the Security Provider 104, a data requests may be generated for the user 101 via the user device 102 using the Client Interface 200 over the network 103.

When the user 101 or stakeholder user 101b adds additional information to the Data Request Database 304 the data in the Data Request Database 304 may be updated with the information added. The data may be stored, modified, added and so forth to any storage medium. A timestamp may be associated with the Client Profile. Examples of timestamp include order of occurrence in a database, date, time of day, and the like.

The Roadmap Database 305 is provided for storing data associated with user 101 and stakeholder user 101b input regarding the users 101 organization. When a user 101 subscribes to services provided by the Security Provider 104, a data requests may be generated for the user 101 via the user device 102 using the Client Interface 200 over the network 103.

When the user 101 or stakeholder user 101b adds additional information to the Roadmap database 305 the data in the Roadmap Database 305 may be updated with the information added. The data may be stored, modified, added and so forth to any storage medium. A timestamp may be associated with the Client Profile. Examples of timestamp include order of occurrence in a database, date, time of day, and the like.

The Exposure Database 306 is provided for storing data associated with Service Provider 104 and Context Platform 105 input regarding Security Breach data. When a user 101 subscribes to services provided by the Security Provider 104, a data may be generated for the user 101 via the user device 102 using the Client Interface 200 over the network 103.

When additional information to the Exposure Database 306 the data in the Exposure Database 306 may be updated with the information added. The data may be stored, modified, added and so forth to any storage medium. A timestamp may be associated with the Client Profile. Examples of timestamp include order of occurrence in a database, date, time of day, and the like.

Although the Context Platform 105 is described as being comprised of various components (e.g. the Consolidation Engine 300, the Data Request Engine 301, the Roadmap Engine 302, the Exposure Engine 303, the Data Request Database 304, the Roadmap Database 305 and the Exposure Database 306), fewer or more components may comprise of the various embodiments.

Figure 4:
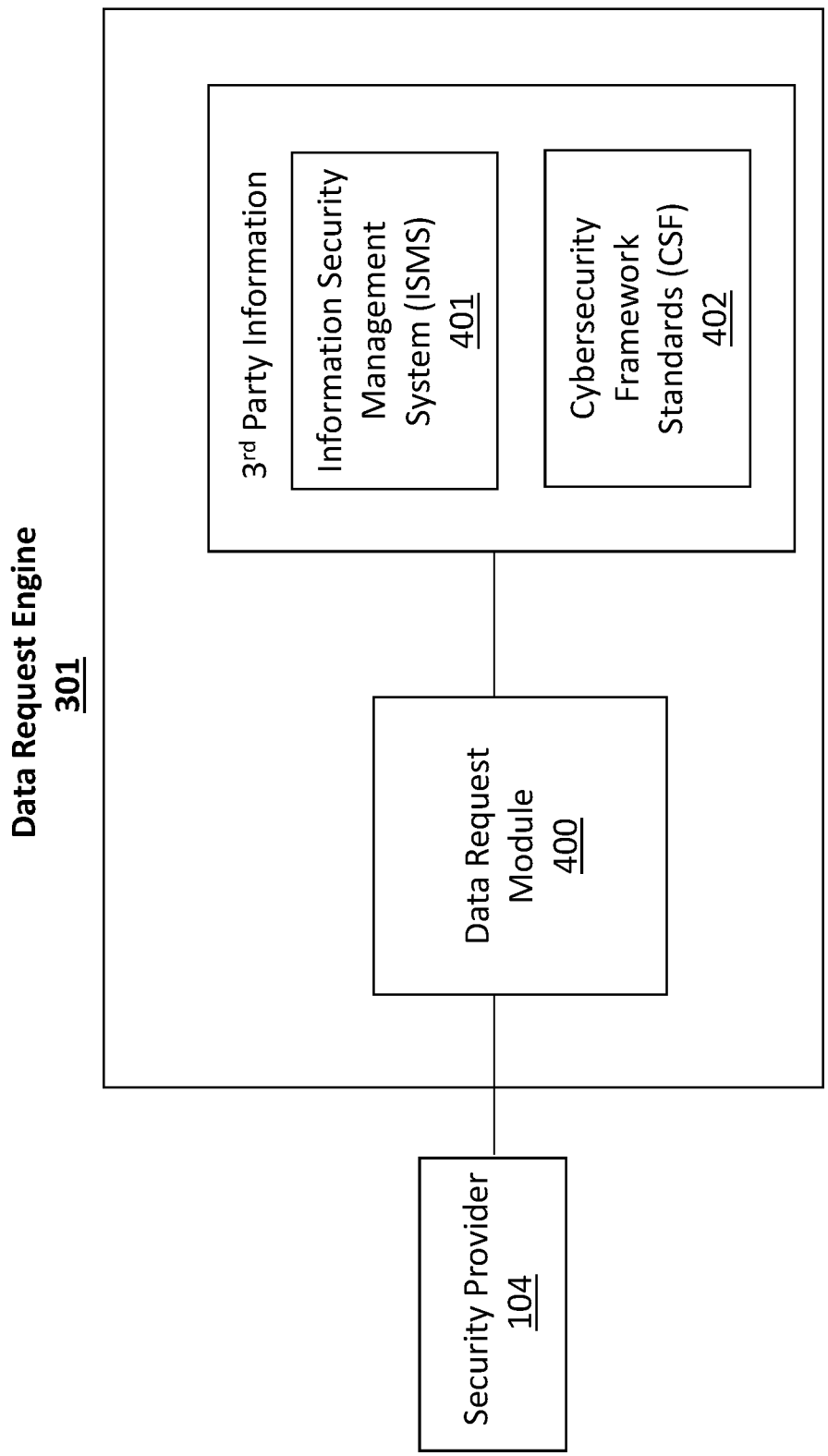
FIG. 4 is a block diagram of a model Data Request Engine.

FIG. 4 is a block diagram of a model embodiment of a Data Request Engine 301. The Data Request Engine 301 is comprised of inputs provided by the Security Provider 104, Information Security Management Systems 401, Cybersecurity Frameworks 402, and real time computations performed by the Data Request Module 400. The inputs from the Security Provider 104, the Information Security Management System 401, and the Cybersecurity Frameworks 402 are presented to the stakeholder users 101b through the Client Interface 200 via a user device 102 on a network 103. The stakeholder users 101b complete the data request and submit the data for computation through the client interface 200 of the Security Provider 104. The data is passed from the client interface 200 to the Data Request Module 400 within the Data Request Engine 301. The Data Request Module 400 takes the data response from the stakeholder user 101b and returns content to the User 101, viewing users 101a, and stakeholder users 101b via the Security Provider 104 to the user devices 102 over the network 103. The Data Request Module 400 sends the output data to the Data Request Database in multiple formats. In one embodiment, the Data Request Module 400 may send baseline data to the Data Request Database 304. In another embodiment, the Data Request Module 400 may send simulated baseline data to the Data Request Database 304 as a result of services being provided by the Roadmap Engine 302. In another embodiment, the stakeholder user 101b may submit data to the Security Provider for consideration for inclusion in the data request. The stakeholder users 101b submitted data may be used to update the Security Providers 104 data request. The updated Security Provider 104 data request is then redistributed to all stakeholder users 101b which will then recompute the data via the Data Request module 400. When additional information is entered into the Data Request Database 304 the Data Request Database 304 may be updated with the information added. The data may be stored, modified, added and so forth to any storage medium. A timestamp may be associated with the Client Profile. Examples of timestamp include order of occurrence in a database, date, time of day, and the like.

Although the Data Request Engine 301 is described as being comprised of various components (e.g. the Data Request Module 400, Information Security Management Systems 401, Cybersecurity Frameworks 402), fewer or more components may comprise of the various embodiments.

Figure 5:
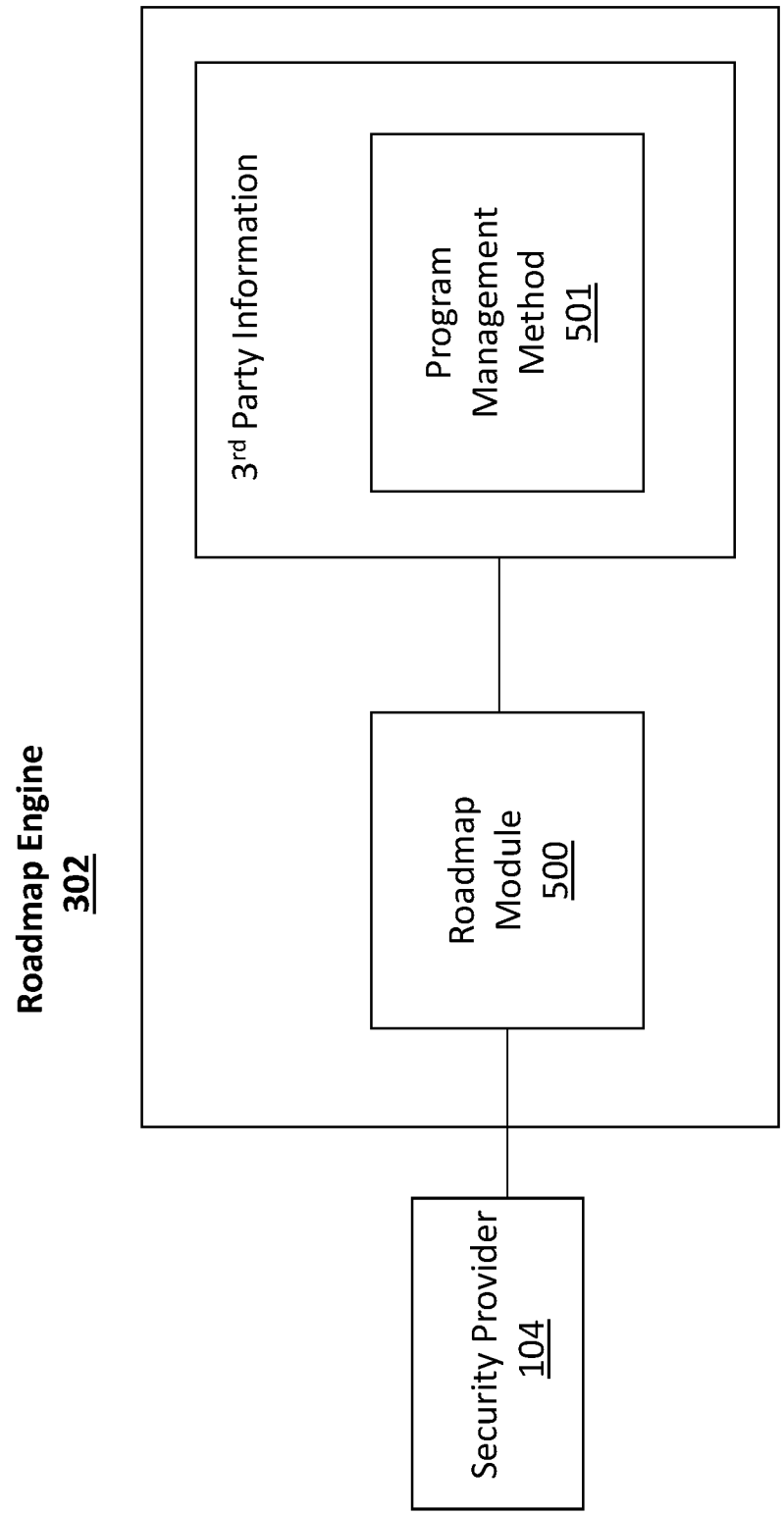
FIG. 5 is a block diagram of a model Roadmap Engine.

FIG. 5 is a block diagram of a model embodiment of a Roadmap Engine 302. The Roadmap Engine 302 is comprised of inputs provided by the Security Provider 104, Program Management Method 501, and real time computations performed by the Roadmap Module 500. Users 101 within an organization may submit a project for consideration through the client interface 200 via the user device 102 on a network 103. The client interface 200 is comprised of inputs from the Security Provider 104 and the Program Management Method 501. The user data is submitted via the client interface 200 and is presented to the stakeholder users 101b through the Client Interface 200 via a user device 102 on a network 103 for processing. The stakeholder users 101b complete the data request and submit the data for computation through the client interface 200 of the Security Provider 104. The data is passed from the client interface 200 to the Roadmap Module 500 within the Roadmap Engine 302. The Roadmap Module 500 takes the data response from the stakeholder user 101b and returns content to the User 101, viewing users 101a, and stakeholder users 101b via the Security Provider 104 to the user devices 102 over the network 103. The Roadmap Module 500 prioritizes the projects based on organizational goals and resource availability. The User can then choose to send the data output through the Data Request Engine 301 for real time dynamic simulated project impact analysis. When additional information is entered into the Roadmap Database 305 the Roadmap Database 305 may be updated with the information added. The data may be stored, modified, added and so forth to any storage medium. A timestamp may be associated with the Client Profile. Examples of timestamp include order of occurrence in a database, date, time of day, and the like.

Although the Roadmap Engine 302 is described as being comprised of various components (e.g. the Roadmap Module 500, Security Provider 104, Program Management Method 501), fewer or more components may comprise of the various embodiments.

Figure 6:
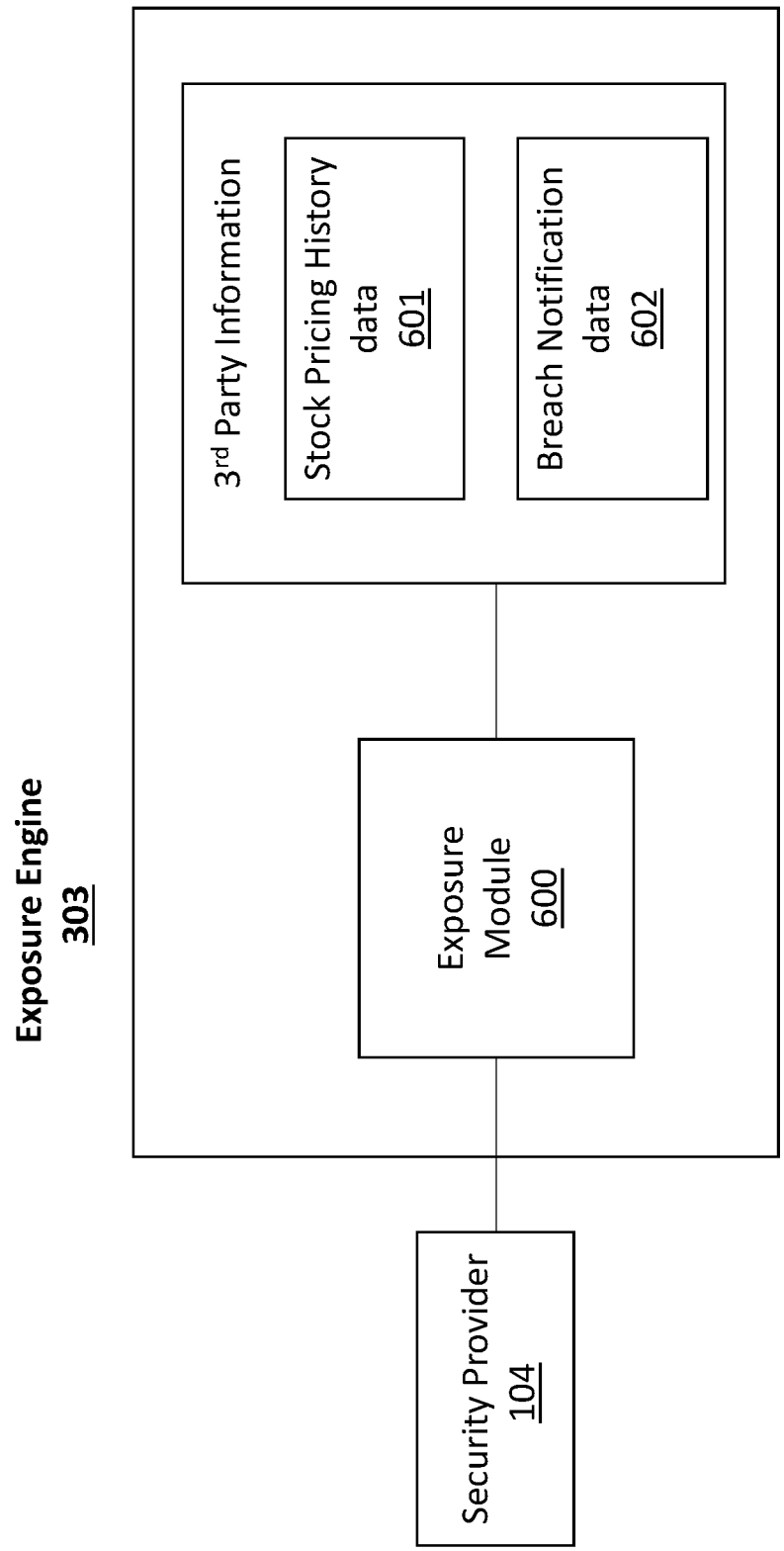
FIG. 6 is a block diagram of a model Exposure Engine.

FIG. 6 is a block diagram of a model embodiment of a Exposure Engine 303. The Exposure Engine 303 is comprised of inputs provided by the Security Provider 104, Stock Pricing History & Feed data 601 and Breach Notification data 602 and real time computations performed by the Exposure Module 600. Historical data is provided by the Security Provider 104 to establish the exposure baseline.

The Exposure Module 600 will be coupled with RSS feeds which provides real time dynamic input of formal notification of organizations regarding Security Breaches, or data leakage. The Breach Notification data 602 is required to identify organizations that have experienced a Security Breach, or Data Leakage. The Exposure Module 600 will be coupled with RSS feeds which provides real time dynamic input of Public Stock Pricing History of organizations identified by the Breach notification data 602. The exposure model utilizes the Stock Pricing History data to compute the organizational exposure value. When additional information is entered into the Exposure Database 306 the Exposure Database 306 may be updated with the information added in real time. The data may be stored, modified, added and so forth to any storage medium. A timestamp may be associated with the Client Profile. Examples of timestamp include order of occurrence in a database, date, time of day, and the like.

Although the Exposure Engine 303 is described as being comprised of various components (e.g. the Exposure Module 600, Security Provider 104, Stock Pricing History data 601, Breach Notification data 602), fewer or more components may comprise of the various embodiments.

Refer now to FIG. 7 a flow diagram of a model process for setting up a client within the Security Provider 104 for services. The user 101 described in 7.a is a company representative authorized to procure services from the Security Provider 104 on behalf of the purchasing organization. Upon receipt of purchase the Security Provider will provide entitlement 7.b to the User organization and send the user 101 the Security Provider Entitlement Notification 7.d. The Security Provider will complete client profile 7.e and submit the configuration through the client interface 200. Once entitlement is issued, the Security Provider will create the user and permissions 7.f. The new user 101 and the Security Provider 104 will be notified of the new entitlement and user creation. The user 101 will have access to maintain certain parameters within the Client Profile Database 203 and setup additional users 101, viewing users 101a, and stakeholder users 101b for the entitled account.

Although the process for setting up a client is described as being comprised of various steps (e.g. 7.a user setup, 7.b entitlement, 7.c Entitlement Notification, 7.d Security Provider Entitlement Notification, 7.e Complete Client Profile, 7.f Create Users and Permissions, 7.g Submit to Security Provider, 7.h Email New User), fewer or more steps may comprise the process and still fall within the scope of the various embodiments.

Refer now to FIG. 8 a flow diagram of a model process for assigning stakeholder users 101b within the Security Provider 104 for services. The authorized user 101 may create stakeholder users 101b for assignment and accountability within the service provided by the Security Provider 104. Once the user creates a stakeholder user 101b a group must be selected for each stakeholder user 101b. There may be multiple categories in which a stakeholder user may exist. For example, a stakeholder may be assigned to the Maturity group, or the Roadmap group, or both. The group assignment will determine the required activities expected from the stakeholder. For example, the roadmap stakeholder user 101b may be required to assess projects that have been submitted via the Roadmap Engine 302; Or, a Maturity group member may be assigned data requests to complete in the determination of an organization's maturity level.

Although the process for setting up a client is described as being comprised of various steps (e.g. 8.a User Setup, 8.b Create Stakeholders and Permissions, 8.c Email new Stakeholders, 8.d Assign to Maturity Group, 8.e Assign to Roadmap Group, 8.f Submit to Security Provider), fewer or more steps may comprise the process and still fall within the scope of the various embodiments.

Refer now to FIG. 9 a flow diagram of a model process for conducting a Data Request process via the Security Provider 104 and the Context Platform 105, more specifically the Data Request Engine 301. During the entitlement process 7.b the user 101 will select a maturity model 9.b. Once the model has been chosen, the User will assign stakeholder users 101b to the data requests 9.c. The stakeholder users will then complete the assigned data requests as seen in step 9.e. Upon completion of the data requests the stakeholder user 101b will have the ability to submit new data requests to the Service provider 104 as seen in 9.f, or to submit the data request as provided by the Security Provider 103 through the client interface 200. If a new data request is submitted by the stakeholder user 101b and accepted by the Security Provider 104, then an email will be sent to all stakeholder users 101b within the maturity group to update their data requests 9.*j*. The completed data requests will then flow back through the Security provider 104 and to the Context Platform 105, more specifically the Data Request Engine 301 for processing. The Data Request Engine 301 content will then be displayed in real time by the Security Provider 104 via the display engine/GUI 201 and made available to users 101, viewing users 101*a*, and stakeholder users 101*b* through user devices 102 over the network 103.

Although the process for setting up a client is described as being comprised of various steps (e.g. 9.*a* User setup, 9.*b* Select Maturity Model, 9.*c* Assign Stakeholders to data requests, 9.*d* Stakeholder User notification, 9.*e* Stakeholders complete data request, 9.*f* Stakeholder submits new data request, 9.*g* Review of data request, 9.*h* Data Request Accepted, 9.*i* Archive data request, 9.*j* Email all stakeholders for new data request, 9.*k* submit to Security provider, 9.*l* Submit to Context Platform 105, 9.*m* display to viewing user), fewer or more steps may comprise the process and still fall within the scope of the various embodiments.

Refer now to FIG. 10 a flow diagram of a model process for conducting a roadmap via the Security Provider 104 and the Context Platform 105, more specifically the Roadmap Engine 302. The User 101 may complete the project profile 10.*b* via the client interface 200. The user 101 will receive email confirmation upon submission 10.*c*. At the same time, the stakeholder users assigned to the roadmap group will receive notification of a new data request as seen in step 10.*d* of the illustration. Each stakeholder will complete the assigned data request in a timely manner 10.3 considering the goals of the organization which have been established by the Security Provider 104 and authorized users through the Security Provider 104, more specifically the client interface 200. The data input from the stakeholders is sent to the Roadmap Engine 105 for processing and ranking 10.*g*. At this point viewing users 101*a* may be able to view the output of the Roadmap Engine 105 via the Security Provider 104. Additionally, authorized users 101 will have the ability to run a simulation of the data content via the Data Request Engine 301.

Although the process for setting up a client is described as being comprised of various steps (e.g. 10.*a* Setup User, 10.*b* Complete Project Profile, 10.*c* Submission Notification to User, 10.*d* Notify Stakeholders of new data request, 10.*e* Stakeholder Criteria Ranking, 10.*f* Stakeholder User Notification, 10.*g* submit to Security Provider, 10.*h* submit to Context Platform, 10.*i* Run Data Request Simulation, 10.*j* Display to viewing users), fewer or more steps may comprise the process and still fall within the scope of the various embodiments.

Refer now to FIG. 11 a flow diagram of a model process for conducting an exposure valuation via the Security Provider 104 and the Context Platform 105, more specifically the Exposure Engine 303. Upon completion of the client profile in step 11.*b*, the Security Provider 104 will align the client profile with the available data from the Exposure Engine 303. The viewing user 101*a* will then be able to view the output via the Security Provider 104, more specifically the display engine/GUI 201.

Although the process for setting up a client is described as being comprised of various steps (e.g. 11.*a* User Setup, 11.*b* Complete Client Profile, 11.*c* Submit to Security Provider, 11.*d* Display to viewing user, 11.*e* submit to Context Platform 105), fewer or more steps may comprise the process and still fall within the scope of the various embodiments.

Refer now to FIG. 12 a flow diagram of a model process for virtual CISO services. A user is setup within the system 12.*a*. The user then completes a user profile 12.*b* and submits it to the Security Provider 104 in step 11.*c*. Viewing users may browse the pool of resources included in the virtual CISO pool via the Security Provider 104 step 11.*d*. Once the Viewing User has identified their need, they can submit the request to the Security Provider 104 for fulfillment 11.*e*. The Security provider will then assess and assign a virtual CISO from the resource pool for the client 11.*f*. All virtual CISOs may be trained on the Security Provider processes and Context Platform 105.

The method for dynamically presenting an ISMS for a particular organization and the potential exposure of IT Risks, while comparing it to like organizations is provided by a computer driven method of managing Information Security Program maturity regarding cybersecurity data collection, the method comprises the steps of: presenting a form aligned with industry standard frameworks, or defined metrics (which can be explained as the collection of cybersecurity rules used to secure and govern an organizations Information Technology assets as identified by recognized institutions such as National Institute of Standards and Technology (NIST), Cybersecurity Maturity Model Certification (CMMC), International Organizations for Standards (ISO), Center for Internet Security (CIS) or as defined by a group of users); addressing both technical and administrative controls which apply to a system (Technical controls can include a broad diversity of devices, but are limited to the IT assets and the configuration of those assets within an individual organization. Each organization will have a unique IT profile, however common controls can be implemented across the diversity of technical controls, such as password enforcement. Examples of technical controls utilizing hardware include firewalls, Intrusion Detection/protection devices, Unified Threat Management, cryptographic modules, etc. Examples of technical controls utilizing software include authentication solutions, antivirus, access control lists, Operating System Configuration. Application Configuration, System Incident and Event Monitoring, etc. Examples of technical controls utilizing firmware include tamper resistance, secure boot, cryptographic verification, secure recovery, etc. Administrative controls on the other hand do not involve the assets themselves, but are policy, procedure, standards, guidelines, training, or legislation that advance a organizations security goals. Examples of Administrative controls include cyber security training of users, Separation of Duties, policy of least privilege, Bring your own device policy, Acceptable Use Policy, etc.) inclusive of all devices and users within the system (which can be explained as organizational controlled IT assets and those utilizing them. Examples include the corporate network, laptops, desktops, applications, mobile devices, locks, HVAC systems, Voice Over IP, etc. The users of include all organizational staff. Maintenance staff may provide enforcement of environmental controls such as temperature control, humidity control, fire suppression, water protection, etc. Grounds keepers may provide fencing, locks, landscaping. The executive team will have controls for network access, laptop configuration, applications usage, content access, etc. The ISMS encompasses all the security controls that apply to the organization to provide a holistic cybersecurity program. There are some scenarios where non-organizational devices may be subject to the organizational controls. This would include the introduction of cloud-based solutions, merger and acquisition targets, and investment scenarios); storing a plurality of stakeholder responses in a database (which can be explained as the user submitting an answer for each of the controls or defined metrics that make up the organizational framework into a relational database); allowing the submission of new form elements (the user can tailor the controls and metrics within the framework to accurately reflect the risk posture desired by the organization under review); dynamically adjusting the maturity of client profiles and displaying the aggregated average comparatively to the user in real time for both technical and administrative controls holistically and also independently (which can be explained as having the ability to look at the aggregate view of the overall organization cybersecurity maturity, or being able to drill down to the individual elements of the aggregate score to identify the impact of individual controls on the overall ISMS); establishing a maturity baseline for the client profile (establishment of the organizational baseline allows for comparison against industry peers and in turn allows for the identification of legal risk); consolidating cybersecurity maturity data in a graphical format to establish a threshold baseline for legal negligence (which can be explained as displaying the data of the individual organization against the anonymized aggregate data of all of the organizations in the system using various graphs such as line graphs, spider graphs, and bullet graphs to visually compare the users baseline score to that of the industry. In doing so, the user will be able to quickly identify the deltas between their organization and organizations like them. The capability to compare like organizations is the basis for establishing the standard of care also generally accepted as the threshold for negligence); limiting access to results created from storing said stakeholder responses and allowing said new form elements and adjusting said client profiles to a limited number of authorized viewers (only authorized users will have access to their organizational scoring or to the anonymized data ensuring that the confidential data being displayed is kept confidential for the user and organization); providing anonymous aggregate data metrics visible to each user profile (not all users have the same level of visibility or need to know and as such the system allows for multiple profiles such as Business Unit Owner, Subject Matter Expert, and Administrator to ensure that only those with a need to know have access to the data associated with their role in the system); ingesting data from an Exposure Engine to calculate cybersecurity standard of care (which can be explained as the establishment of an average score for individual controls, average scores for each industry, and average for all organizations to support the establishment of reasonablness which is essential legal concept in the determination of negligence and the potential liability for a tort known as the standard of care); and displaying the standard of care in real time to at least one user of the predetermined set of viewing users (which can be explained as comparing user data to the average data scores for each industry, and average data scores for all organizations which provides the user visibility into the legal risk via dashboards and reporting based on the users permitted views within the system).

Several embodiments are specifically illustrated and/or described herein. However, it will be appreciated that modifications and variations are covered by the above teachings and within the scope of the appended claims without departing from the spirit and intended scope thereof. For example, if the opening historical stock pricing history data 601 is used in determination of exposure value via the Exposure Engine 303, then the same consideration would apply if the closing stock price history data 601 was used in the determination of the exposure value via the Exposure Engine 303. Method steps described herein may be performed in alternative orders. Various embodiments of the invention include logic stored on computer readable media and the logic configured to perform methods of the invention. The examples provided herein are exemplary and are not meant to be exclusive.

The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps, possesses those one or more steps, but is not limited to possessing only those one or more steps. Likewise, a step of a method or an element of a device that "comprises," "has," "includes" or "contains" one or more features, possesses those one or more features, but is not limited to possessing only those one or more features.

What is claimed is:
1. A computer driven method of managing Information Security Program maturity and risk regarding a cybersecurity data collection and application to calculate cybersecurity standard of care in real-time also known as the legal basis for calculating the threshold for legal negligence in tort law, for an identified practice, the method comprising:
   presenting a form aligned with open industry standard frame works and customized controls based on said open industry standard frame works;
   addressing both technical and administrative controls which apply to a system, inclusive of all devices within the system;
   storing a plurality of stakeholder responses in a continuously updated database;
   allowing a submission of a plurality of new individual industry controls;
   dynamically adjusting a control maturity of client profiles and displaying an aggregated average comparatively to the user in real time for both technical and administrative controls holistically and also independently;
   establishing a maturity baseline for a client profile upon receiving an entirety of a data set of inputs, independent of the level of compliance, and for each individual control;
   aggregating a maturity score from one, or multiple assessments into a single score which requires the maturity of all controls within a selected framework utilized together to identify and compare the delta between a current maturity score and the collective score of a specified industry to establish the gap, or risk associated with a control, and comparing gaps to one another in totality to rank them based on their adherence with tort law;
   consolidating cybersecurity maturity data in a graphical format to establish a legal risk baseline for the user based on the control maturity using the maturity scoring against an industry average to establish a legal application of the data known in tort law as the "standard of care" based upon the measurement of the delta between current state baselines and the industry average score as a function of the amount of risk being carried by an organization;

limiting access to results created from storing said stakeholder responses and allowing said new controls and adjusting said client profiles to a limited number of viewing users;

providing industry specific anonymous aggregate data metrics regarding identification of legal risk for negligence visible to said client profile;

ingesting data from an Exposure Engine to calculate cybersecurity standard of care in real-time, or a threshold for legal negligence, for a selected industry in the establishment of new data points to further establish a standard of care for cybersecurity which is applied in real time across the entire data set associated with the selected taxonomy and unique organizational factors including, an applied weight, allowing for unique organizational risk profiles to be established, independent of an organizational level of compliance, individually or comparatively, or a system or systems;

displaying the standard of care in real time to at least one user of a predetermined set of viewing users confidential to each user of the system.

2. The method of claim 1, wherein at least one information security management system, cybersecurity framework, or data request model is chosen via a dropdown menu inclusive of standard framework, custom controls, or a combination of both.

3. The method of claim 1, further comprising the step of inquiring, from the user, specific industry relevant knowledge aligned to an information security management system, cybersecurity framework, or data request model selected by the user, wherein said inquiry supports the creation or refinement of a standard or custom control framework.

4. The method of claim 3, wherein a control response is provided via radio button, sliding scale, or other industry accepted scoring methodology, to each authorized user including a relevant business justification of a selection Criteria in free form text.

5. The method of claim 1, wherein the cybersecurity maturity data and an associated business justification collected is stored and made readily available for computation and contextual reference.

6. The method of claim 1, wherein a new custom control is introduced to a platform by the user and applied to any group of selected users in both existing and new under review.

7. The method of claim 6, including a step of assessing the new control once submitted by the use.

8. The method of claim 7, including a step of applying the new control to all existing instances within a user selected information category.

9. The method of claim 1, including a step of updating all system data inputs, either by the administrator or user, in real time within the information category based on the inclusion of the new user input on the aggregation of a relevant data set.

10. The method of claim 1, including a step of displaying resulting dynamic content detail for a particular user, while providing comparison against an aggregate view of all users without disclosing any data association to establish a delta score between the user's maturity score and the industry specific anonymous aggregate data metrics.

11. The method of claim 1, further comprising applying filter to the data as to prevent or allow specific groups to be displayed.

12. The method of claim 1, including a step of anonymizing data sources is invoked to provide anonymity within the response data.

13. The method of claim 1, wherein data from the Exposure Engine is used to develop additional performance metrics including but not limited to organizational level information used to identify systemic exposure.

14. The method of claim 1, including a step of comparison of delta scores within a user selected data set selected from the group consisting of control framework, control family, Control ID, or custom control selection to categorize and list a control delta based on ascending or descending delta scores.

15. The method of claim 1, including a step of comparison of positive and negative delta scores to establish a balanced risk profile based on the user's acceptable risk profile.

16. The method of claim 1, including a step of aggregating a plurality of user selected set of assessments and applying weight to each user selected set of assessment utilizing user defined metrics to create a weighted risk score calculation for a user defined data set without anonymization and across industries creating a unique risk profile for each organization based on the weighted current state and standard of care.

17. The method of claim 1, including a step of displaying each assessment in an aggregated view, or individually, allowing the user to select different metrics within various levels of a weighted data set.

* * * * *